(12) United States Patent
Li et al.

(10) Patent No.: US 11,819,047 B2
(45) Date of Patent: Nov. 21, 2023

(54) CAM ROLLER TYPE HORIZONTAL EXTRUSION CRACKING SYSTEM FOR WALNUTS

(71) Applicants: QINGDAO UNIVERSITY OF TECHNOLOGY, Shandong (CN); XINJIANG JIANG NING LIGHT INDUSTRIAL MACHINERY ENGINEERING TECHNOLOGY CO., LTD., Xinjiang (CN)

(72) Inventors: Changhe Li, Qingdao (CN); Mingzheng Liu, Qingdao (CN); Yucheng Wang, Qingdao (CN); Yanbin Zhang, Qingdao (CN); Ji Che, Qingdao (CN); Yali Hou, Qingdao (CN); Xiaoming Wang, Qingdao (CN); Yitian Feng, Qingdao (CN); Rong Wang, Qingdao (CN); Yiping Feng, Qingdao (CN); Huaiyu Wang, Qingdao (CN); Zhenming Jia, Qingdao (CN); Lei Zhao, Qingdao (CN); Guangzhen Miao, Qingdao (CN); Runze Li, Qingdao (CN); Teng Gao, Qingdao (CN)

(73) Assignees: QINGDAO UNIVERSITY OF TECHNOLOGY, Qingdao (CN); XINJIANG JIANG NING LIGHT INDUSTRIAL MACHINERY ENGINEERING TECHNOLOGY CO., LTD., Urumqi (CN)

( * ) Notice: Subject to any disclaimer, the term of this patent is extended or adjusted under 35 U.S.C. 154(b) by 374 days.

(21) Appl. No.: 17/279,436

(22) PCT Filed: Feb. 6, 2020

(86) PCT No.: PCT/CN2020/074392
§ 371 (c)(1),
(2) Date: Mar. 24, 2021

(87) PCT Pub. No.: WO2021/103313
PCT Pub. Date: Jun. 3, 2021

(65) Prior Publication Data
US 2022/0030924 A1    Feb. 3, 2022

(30) Foreign Application Priority Data
Nov. 25, 2019 (CN) .......................... 201911168497.7

(51) Int. Cl.
*A23N 5/00* (2006.01)
(52) U.S. Cl.
CPC ....................................... *A23N 5/00* (2013.01)
(58) Field of Classification Search
CPC ....................................................... A23N 5/00
See application file for complete search history.

(56) References Cited

U.S. PATENT DOCUMENTS

| 3,884,137 A | * | 5/1975 | Breton | ..................... A23N 5/00 198/623 |
| 4,515,076 A | | 5/1985 | Reznik | |

(Continued)

FOREIGN PATENT DOCUMENTS

| CN | 103610215 A | 3/2014 |
| CN | 102771877 B | 10/2014 |

(Continued)

OTHER PUBLICATIONS

Abstract of ES-1230937-U (Year: 2019).*

(Continued)

*Primary Examiner* — Erin McGrath
(74) *Attorney, Agent, or Firm* — Oliff PLC

(57) ABSTRACT

A cam roller type horizontal extrusion cracking system for walnuts, including feeding, cracking and falling devices fixed accordingly on a stand. The feeding device includes a feeding box; an intermittent feeding roller is arranged therein; one side of the roller includes a feeding baffle plate, the other side includes an adjustable feeding scraper blade mechanism; and opposing feeding slots are formed in the roller. The cracking device includes an extrusion box body; movable and fixed tooth-shaped extrusion plates are oppositely mounted therein; one side of the movable plate opposite the fixed includes an extrusion cam; the plates have a plurality of tooth gaps; a walnut passes through the feeding device, falls into a gap between the plates; the cam drives the movable plate to do a periodic reciprocating motion, to synchronously cooperate with the fixed plate to perform extrusion cracking on the walnut.

10 Claims, 10 Drawing Sheets

(56) References Cited

U.S. PATENT DOCUMENTS 4,793,248 A * 12/1988 Frederiksen ............. A23N 5/00
                                                                                           99/575
2020/0268034 A1* 8/2020 Savage ................ A23N 12/005

FOREIGN PATENT DOCUMENTS

| CN | 105852151 A | | 8/2016 | |
|---|---|---|---|---|
| CN | 106473167 A | * | 3/2017 | ............. A23N 5/00 |
| CN | 106473167 A | | 3/2017 | |
| CN | 207978892 U | | 10/2018 | |
| CN | 110710692 A | | 1/2020 | |
| ES | 1230937 U | * | 6/2019 | ............. A23N 5/00 |
| FR | 2 930 407 B1 | | 2/2011 | |

OTHER PUBLICATIONS

Text of CN-106473167-A (Year: 2017).*
Aug. 26, 2020 International Search Report issued in International Patent Application No. PCT/CN2020/074392.
Aug. 26, 2020 Written Opinion of the International Searching Authority issued in International Patent Application No. PCT/CN2020/074392.

* cited by examiner

CAM ROLLER TYPE HORIZONTAL EXTRUSION CRACKING SYSTEM FOR WALNUTS

BACKGROUND

Technical Field

The present disclosure belongs to the technical field of walnut processing and cracking, and in particular relates to a cam roller type horizontal extrusion cracking system for walnuts.

Related Art

Walnut kernels are food with extremely high nutritional value, and have the following advantages: 1. Providing nutrients. Walnuts are rich in nutritional value. Walnut kernels not only contain rich protein, fat, carbohydrate and other nutrients, but also contain calcium, phosphorus, iron and other trace elements necessary for organic organisms, as well as carotene and other vitamins necessary for a human body. 2. Softening blood vessels to prevent arteriosclerosis. Walnuts are rich in fat, and most of the fats are unsaturated fats. The unsaturated fats can help lower blood lipids and blood pressure as well as cholesterol, and also have a certain preventive effect on atherosclerosis. 3. Supplementing trace elements. Walnut kernels contain manganese, zinc, chromium and other indispensable trace elements for the human body, which play a good role in supplementing the necessary trace elements for the human body. 4. Tonifying deficiency and strengthening the body to prevent constipation. Walnuts are sweet in taste and warm in nature, and have a very good effect on invigorating the kidney, strengthening the essence, relaxing bowel, relieving cough, reducing phlegm and the like. 5. Resisting oxidization and delaying senility. Walnut kernels are rich in vitamin B and vitamin E, which act as strong antioxidants to remove excess free radicals in the human body and prevent cell senescence, and play a role of delaying senility. 6. Promoting the development of the nervous system, strengthening the brain and improving the intelligence. Walnuts are rich in lecithin and DHA, which can prevent Alzheimer's disease and improve the memory for the elderly, and can promote the development of the nervous system and improve the intelligence for infants and young children. The trace elements such as zinc and manganese contained in walnuts are important components of the hypophysis cerebri. Regular consumption is conductive to supplementing the brain nutrition and beneficial to improving the intelligence. 7. Preventing and treating neurasthenia and assisting sleep. Walnut kernels are rich in protein and melatonin. Regular consumption is good for sleep, and has a good effect of relieving fatigue, helping sleep and resisting pressure. 8. Maintaining beauty, keeping young and preventing alopecia. Walnut kernels contain linoleic acid and trace elements such as calcium, phosphorus and iron, which are very ideal skin cosmetics. Regular consumption can help moisturize the skin and blacken hairs, and also has the effect of preventing and treating frequent hair loss and premature whitening. 9. Preventing and resisting cancers. Through experiments on mice, related researchers have proved that walnuts can resist multiplication of cancer cells, have a very good analgesic effect on pain reactions of cancer patients, and can enhance the resistance of leukocytes.

Walnuts are favored by people for their rich nutrients and high edible value, and have great market potential in China. With the support of national policies and the continuous increase of market demands, the walnut output in China has increased year by year, and problems in deep processing of walnuts that followed are also highlighted year by year. A cracking and kernel extraction procedure for walnuts is the primary problem faced during deep processing. Due to a relatively backward technology for mechanized walnut cracking, in order to ensure the integrity of walnut kernels, in many methods for cracking and kernel extraction of walnuts, people often use a manual method to crack walnuts, that is, people use a blunt tool made of a flexible material to artificially knock walnut shells to make their surfaces crack, so that the shells are perfectly cracked and removed without damaging the walnut kernels. However, the work efficiency of such a cracking and kernel extraction process is extremely low, and the labor cost is relatively high. In addition, walnuts have hard, thick and irregular shells; many partitions exist in walnuts; and walnut kernels are fragile, so that great difficulty is brought to the cracking and kernel extraction procedure for walnuts. The marketing shows that the integrity of walnut kernels will directly affect the economic benefits of walnuts. Walnut kernels are rich in nutrients such as oil and protein. If the surface of a walnut kernel is damaged in the cracking and kernel extraction procedure for walnuts, the unsaturated fatty acids in the walnut kernel will overflow and be oxidized, and the nutritional value will be lost, and thus greatly reducing the economic benefits. Therefore, improving the work efficiency and the integrity of walnut kernels has become the key to cracking and kernel extraction for walnuts. Since the walnut processing level in China is relatively low, particularly the cracking and kernel extraction technology, the industrialization development of the walnut processing industry in China is restrained to a certain extent. In recent years, with people's deep research on a mechanized walnut cracking technology, many novel walnut cracking devices have come out one after another. At present, a traditional walnut cracking machine mainly uses a physical impact extrusion method to crack walnut to extract kernels, including: rolling, impacting, shearing, extrusion and ultrasonic crushing. The previous four methods all use a certain gap between a walnut shell and a walnut kernel, and rigidly apply a pressure through a mechanical device to achieve a crushing effect on the shell. The inventor believes that during the use of this type of mechanical device, walnuts without any treatment are often directly put into the walnut cracking machine for processing. This processing method has the disadvantages of low whole-kernel rate, low efficiency, and the like.

Li Changhe, Li Jingyao, Wang Sheng and Zhang Qiang from Qingdao University of Technology invented a walnut cracking and picking device (patent number: ZL201210277037.X). This device includes a walnut compression grinding device, a shell and kernel stirring device, a shell and kernel sorting device and a power device of the whole device. The power device is respectively connected with the shell and kernel sorting device and the walnut compression grinding device through a V-shaped belt. First, walnuts are crushed by the compression grinding device, reach a discharge port of the walnut compression grinding device, and then enter the shell and kernel stirring device and the shell and kernel sorting device realized by wind force sorting to finally realize automation of shell and kernel separation. In addition, the device adopts a height adjustment device to adapt to different varieties of walnuts. Based on this, this device can be used in large batches of different types of walnut processing operations. As such, the labor time is shortened; labor is saved; and production cost is reduced. The problems of difficulty in current mechanized walnut cracking and kernel picking and high dependence on manual work are better solved; and the cracking rate and the high kernel exposure rate are increased to a certain extent, which realizes efficient economical production.

Liu Mingzheng, Li Changhe and Zhang Yanbin from Qingdao University of Technology invented a walnut shearing-extrusion cracking, flexible-thrashing and kernel-taking equipment (patent number: ZL201310634619.3). The equipment includes: a feeding hopper; a flat belt shearing-extrusion cracking device for receiving materials from the feeding hopper; and a flexible helical blade thrashing system for receiving materials with the shells cracked preliminarily supplied by the flat belt shearing-extrusion cracking device and performing thrashing for secondary cracking. The lower part of the flexible helical blade thrashing system is provided with a walnut shell and walnut kernel separation device for receiving shell and kernel mixtures obtained after the thrashing for secondary cracking and separating shells from kernels by means of wind separation; the flat belt shearing-extrusion cracking device and the walnut kernel separation device are connected with a transmission system; the transmission system is connected with a power source I; the flexible helical blade thrashing system is connected with a power source II; and all of the above-mentioned apparatuses are mounted on a rack.

Li Changhe, Xing Xudong, Ma Zhengcheng, Zhang Xiaoyang, Yang Fan, Xu Haonan, Zhou Yabo and Han Yiming from Qingdao University of Technology invented a walnut cracking device with automatic conveying and positioning functions, and a method for applying the walnut cracking device (patent number: ZL201610225509.5). The device includes at least one walnut fixing mechanism and at least two knocking rods which are arranged on a framework. A walnut feeding hopper is arranged above the walnut fixing mechanism; walnut positioning holes are formed in a walnut cracking mold; a positioning and quantitative conveying sliders used for covering each walnut positioning hole is arranged on each of two sides of the walnut positioning hole; at least two open holes communicating with the walnut positioning holes are formed in the side wall of the walnut cracking mold; and a plurality of knocking rods are driven by a moving mechanism to pass through the open hole corresponding to each knocking rod to knock a walnut arranged in the walnut positioning holes. This disclosure uses a stirring device for feeding, so that it is ingenious in structure, high in efficiency and extremely low in fault rate. The shape of a discharge hole of the feeding hopper of this disclosure and the shape of a through hole in a positioning and conveying mechanism adopt the shape of a walnut positioning section, so that a positioning result of the walnut in a series of falling processes is ensured to be stable and unchanged, the attitude of the walnut is precise and controllable, and automation and control of walnut feeding are realized.

Li Changhe, Wang Yucheng, Xu Huicheng, Hong Yuan, Wang Xiaoming, Deng Lele, Yuan Pengfei and Ma Zhengcheng from Qingdao University of Technology invented a device for cracking walnut and taking walnut kernels, having functions of self-positioning, pre-cracking, equidirectional spiral self-grading and flexible extrusion (patent number: ZL201611045149.7). The device includes an intermittent feeding device, a pre-cracking device, a flexible cracking device, and a separating device which are fixed on a machine frame. The intermittent feeding device feeds materials to the pre-cracking device intermittently in batches; the pre-cracking device includes an extrusion portion and a blanking portion which cooperate with each other; the extrusion portion does a reciprocating motion and cooperates with the blanking portion to extrude a walnut to cause the walnut to crack; the blanking portion does a reciprocating motion to enable the extruded walnut to fall into the flexible cracking device; and the flexible cracking device cracks the walnut shell, and then the separating device separates and stores the shells and kernels which are obtained after cracking. This device is integrated with a plurality of systems and compact in structure, reduces both the manufacturing cost of a machine and the occupied area during operation of the machine, and is favorable for miniaturization and high-efficiency production of machinery. The structural design can realize various connection cooperation work such as splicing combination, can meet the requirements of various production scales and production sites, and is also applicable to families and applied more widely.

The overall shortcomings of the above cracking and kernel extraction machines are: although the walnut cracking effect has initially met the requirements of subsequent production, the efficiency is affected to a certain extent, and the quality requirements for the obtained walnut kernels, such as the rate of perfect kernel, are still lower than those of manual shelling.

Hui Taiji, Hui Fuping and Qiao Shouqiang from Pengyang Taiming Food Processing Co., Ltd. invented a machine for cracking walnut (patent number: ZL201820145798.2). The machine includes a frame body, an oblique slot, a chute board, a fixed crushing portion, a movable crushing portion and a receiving slot. The oblique slot is fixed at the upper part of the frame body; a walnut rolls to an outlet of the oblique slot under the action of the gravity; one end of the chute board is fixedly connected to an opening of the oblique slot to receive the walnut for preparation for processing, and the other end of the chute board is located between the fixed crushing portion and the movable crushing portion; the fixed crushing portion is fixedly assembled on the right side of the front end of the upper part of the frame body, and the movable crushing portion is assembled on the left side of the front end of the upper portion of the frame body; the movable crushing portion on the left side is hinged to the right side to extrude and crush the walnut to obtain a shell and kernel mixture. The receiving slot is fixedly assembled at the bottom of the frame body, and is located below a position between the fixed crushing portion and the movable crushing portion, i.e., located below the other end of the chute board to catch the crushed walnut.

This method has the deficiencies of unilateral pursuit for the walnut cracking rate, and the cracking rate is relatively low, so that the quality of walnut kernels is severely lowered. The walnut kernels are greatly damaged to cause many broken kernels, which severely affect the subsequent commercial sale, and there is a big discount in the economic benefit.

Based on the above factors, in combination with the current concept of green and low-carbon development, as well as a full understanding of a cracked structure of a walnut, it is found that the promotion of a multi-station accurate walnut falling technology and a horizontal extrusion cracking technology is of great significance for improving the economic benefits. Moreover, by means of designing a cam roller type horizontal extrusion cracking system for walnuts, the accuracy and high efficiency of walnut feeding can be significantly improved. However, related devices are not perfectly developed, and an existing cracking device has a non-ideal cracking effect, and generally has shortcomings of high unit energy consumption and low economy.

SUMMARY

The present disclosure is directed to overcome the deficiencies of the above prior art, and provides a cam roller type horizontal extrusion cracking system for walnuts. The system is integrated with three functions: walnut feeding, cracking and falling. An intermittent feeding roller and an adjustable feeding scraper blade mechanism are combined to realize that each walnut can be self-positioned and correspondingly fall into respective feeding slot of the intermittent feeding roller to achieve efficient and accurate feeding. An extrusion cam rotates to drive a movable tooth-shaped extrusion plate to do a periodic reciprocating motion, so as to cooperate with a fixed tooth-shaped extrusion plate to perform horizontal extrusion cracking on the walnuts. A turning plate cam causes a falling turning plate to do a periodic opening and closing motion and cooperate with the cracking device, thereby realizing a synchronous falling function.

An invention objective of the present disclosure is to provide a cam roller type horizontal extrusion cracking system for walnuts. In order to achieve the above objective, the present disclosure uses the following technical solution:

a cam roller type horizontal extrusion cracking system for walnuts includes a feeding device, a cracking device and a falling device which are fixed on a stand; the feeding device is arranged above the cracking device; and the falling device is arranged below the cracking device;

the feeding device includes a feeding box; an intermittent feeding roller is arranged in the feeding box; one side of the intermittent feeding roller is provided with a feeding baffle plate, and the other side is provided with an adjustable feeding scraper blade mechanism; and two rows of feeding slots separated by 180° are formed in the intermittent feeding roller;

the cracking device includes an extrusion box body; a movable tooth-shaped extrusion plate and a fixed tooth-shaped extrusion plate are oppositely mounted in the extrusion box body; one side of the movable tooth-shaped extrusion plate away from the fixed tooth-shaped extrusion plate is provided with an extrusion cam; the movable tooth-shaped extrusion plate and the fixed tooth-shaped extrusion plate respectively have a plurality of tooth gaps; a walnut passes through the feeding device, and then falls into a gap between the movable tooth-shaped extrusion plate and the fixed tooth-shaped extrusion plate; the extrusion cam is used to drive the movable tooth-shaped extrusion plate to do a periodic reciprocating motion, so as to synchronously cooperate with the fixed tooth-shaped extrusion plate to perform extrusion cracking on the walnut; and the falling device includes a falling turning plate, a turning plate cam and a falling guide plate; the turning plate cam is located below the falling turning plate; and the falling turning plate and the falling guide plate are in contact with each other during falling.

A working principle of the cracking system for the walnuts of the present disclosure is that:

intermittent walnut feeding is realized by means of the intermittent feeding roller of the feeding device, and the feeding slots in the intermittent feeding roller are used as cavities for feeding, so that a walnut is accurately aligned with a gap station of the two tooth-shaped extrusion plates in the cracking device below. The walnut falls into the tooth gaps of the movable tooth-shaped extrusion plate and the fixed tooth-shaped extrusion plate after passing through the feeding device; and at this time, the falling turning plate is in tight fit with the two tooth-shaped extrusion plates. The extrusion cam drives the movable tooth-shaped extrusion plate to do a periodic reciprocating motion, so as to cooperate with the fixed tooth-shaped extrusion plate to perform extrusion cracking on the walnut. After the walnut passes through the cracking device, the turning plate cam is used to cause the falling turning plate to do a periodic opening and closing motion and synchronously cooperate with the cracking device, so that the cracked walnut falls to the falling guide plate and slides down along the direction to complete the whole cracking work. Each station repeats the above working flow immediately.

As a further technical solution, the intermittent feeding roller is horizontally mounted in the feeding box; the intermittent feeding roller includes a plurality of feeding roller constitution units; and a spacer is arranged between adjacent feeding roller constitution units.

As a further technical solution, the feeding baffle plate and the adjustable feeding scraper blade mechanism are distributed in a set angle; the adjustable feeding scraper blade mechanism includes an upper feeding scraper blade and a lower feeding scraper blade, and a mounting position of the lower feeding scraper blade on the upper feeding scraper blade is adjustable to match the sizes of the walnuts in the feeding slots, thereby achieving the applicability to feeding of walnuts in various sizes.

As a further technical solution, the tooth gaps of the movable tooth-shaped extrusion plate and the fixed tooth-shaped extrusion plate are in one-to-one correspondence to the feeding slots of the intermittent feeding roller, and distances between the tooth gaps during feeding are equal to slot widths of the feeding slots.

As a further technical solution, a sum of the gap between the movable tooth-shaped extrusion plate and the fixed tooth-shaped extrusion plate and a large diameter of the walnut is a radius of the intermittent feeding roller. During feeding of the feeding slots, walnuts can accurately fall into the gap.

A depth of each feeding slot matches the large diameter of the walnut, and the intermittent feeding roller cooperates with the adjustable feeding scraper blade mechanism, so that only one walnut passes through each feeding slot during each feeding, and quantitative and accurate feeding is realized.

As a further technical solution, the movable tooth-shaped extrusion plate is connected with the falling guide plate by means of a falling guide plate positioning shaft; the falling guide plate positioning shaft is connected with the extrusion box body; one side of the falling guide plate facing away from the movable tooth-shaped extrusion plate is provided with an extrusion rolling bearing; and the extrusion rolling bearing cooperates with extrusion of the extrusion cam.

As a further technical solution, the fixed tooth-shaped extrusion plate is connected with a gap adjustment mechanism; and gap adjustment between the fixed tooth-shaped extrusion plate and the fixed tooth-shaped extrusion plate is realized by means of the gap adjustment mechanism.

As a further technical solution, the gap adjustment mechanism includes an adjustable screw rod; one end of the adjustable screw rod is fixedly connected with a horizontal plate through a nut; a fixed slot cooperating with a vertical column of the fixed tooth-shaped extrusion plate is formed in the horizontal plate; the other end of the adjustable screw rod is provided with an adjustment nut; and the adjustable screw rod adjusts the position of the fixed tooth-shaped extrusion plate through the adjustment nut to control the gap between the two tooth-shaped extrusion plates.

As a further technical solution, the turning plate cam is connected with a power device through a transmission mechanism; and the turning plate cam is in linear contact with the falling turning plate through a rolling bearing to realize periodic intermittent swinging of the falling turning plate. When a walnut passes through the feeding device and enters the cracking device, the turning plate cam is in a process of moving from a minimum stroke to a maximum stroke; and when the turning plate cam is located at the minimum stroke, the falling turning plate is aligned with the falling guide plate.

As a further technical solution, a feeding roller shaft is mounted in a center of the intermittent feeding roller; one end of the feeding roller shaft is provided with a threaded region; and two sides of the feeding roller shaft are provided with feeding roller positioning screw rods that pass through the intermittent feeding roller.

Compared with the prior art, the present disclosure has the following beneficial effects:

(1) The cam roller type horizontal extrusion cracking system for walnuts of the present disclosure can realize, by means of the specially designed feeding device, accurate feeding of walnuts in different sizes, and can improve, by means of cooperation between a rotating speed of the intermittent feeding roller and a rotating speed of the extrusion cam in the extrusion device, the conveying rate of walnuts for preparation for the next step of quick cracking.

(2) By use of the tooth-shaped extrusion plates to synchronously extrude the stations, the cam roller type horizontal extrusion cracking system for walnuts of the present disclosure realizes symmetric point extrusion for the walnuts to perform the cracking work.

(3) In the cam roller type horizontal extrusion cracking system for walnuts of the present disclosure, the intermittent feeding roller and the adjustable feeding scraper blade mechanism cooperate with each other, so that each feeding slot of the intermittent feeding roller is ensured to store and convey one walnut, which avoids missed extrusion caused by a plurality of walnuts falling into the extrusion device.

(4) In the cam roller type horizontal extrusion cracking system for walnuts of the present disclosure, the periodic motions of the extrusion cam and the movable tooth-shaped extrusion plate cooperate with a feeding cycle of the intermittent feeding roller, so that the extrusion device is synchronized twice for each cycle of rotation of the feeding roller, thereby improving the cracking rate of the system.

(5) In the cam roller type horizontal extrusion cracking system for walnuts of the present disclosure, the falling turning plate is periodically driven by the turning plate cam to be in intermittent contact with the two tooth-shaped extrusion plates; at the end of extrusion, the falling turning plate and the tooth-shaped extrusion plates are in open states, so that extruded walnuts quickly fall into a collection container; during falling, the falling turning plate and the two tooth-shaped extrusion plates are in tight fit to ensure that the falling walnuts can accurately fall into the gap between the two tooth-shaped extrusion plates; and the extrusion cam then drives the movable tooth-shaped extrusion plate to crack the walnuts, thereby improving the extrusion efficiency.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

Figure 1:
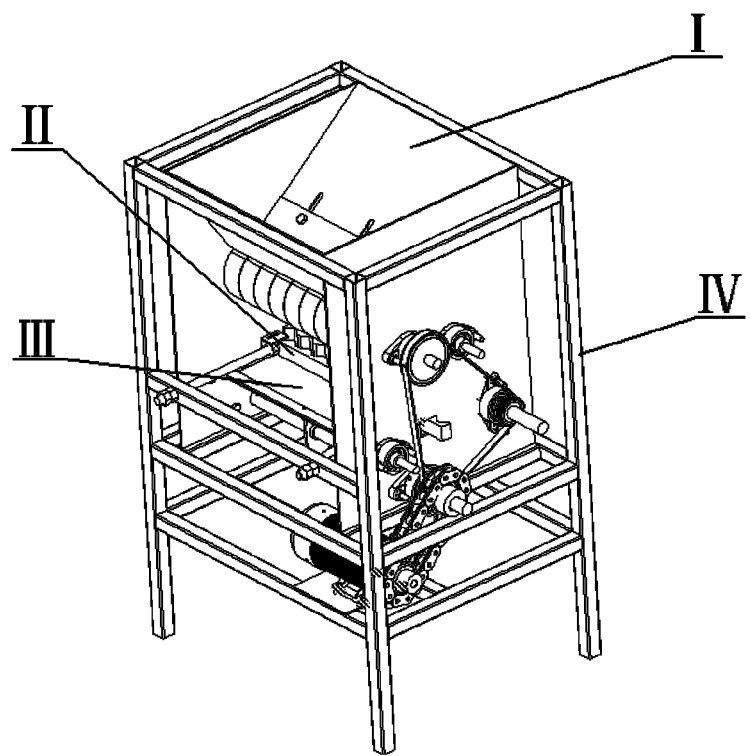
FIG. 1 is an axis side diagram of a cam roller type horizontal extrusion cracking system for walnuts.

In the drawings: feeding device I, cracking device II, falling device III, stand IV;

I-01: adjustable feeding scraper blade mechanism; I-02: case left side plate; I-03: feeding baffle plate; I-04: intermittent feeding roller; I-05: case right side plate; I-0101: lower feeding scraper blade; I-0102: upper feeding scraper blade; I-0103: hexagon flange nut; I-0201: feeding roller shaft bearing hole; I-0202: falling guide plate positioning shaft bearing hole; I-0203: extrusion cam shaft bearing hole; I-0204: fixed tooth-shaped extrusion plate limit hole; I-0205: falling turning plate shaft bearing hole; I-0206: turning plate cam bearing hole; I-0401: feeding roller constitution unit; I-0402: spacer; I-0403: feeding roller shaft; I-0404: feeding roller shaft fastening nut; I-0405: feeding roller positioning screw rod; I-0406: feeding roller positioning screw rod nut; I-0407: feeding roller shaft fastening ring positioning pin; I-0408: feeding roller shaft fastening ring; I-040101: feeding slot; I-040102: feeding roller constitution unit shaft hole; I-040103: feeding roller shaft fastening nut counterbore; I-040104: feeding roller positioning screw rod nut counterbore; I-040105: feeding roller positioning screw rod hole; I-040201: spacer positioning screw rod hole; I-040202: spacer shaft hole; I-040301: feeding roller shaft bearing fastening hole; I-040302: feeding roller shaft fastening hole; I-040303: threaded region.

II-01: belt wheel; II-02: extrusion mechanism movable tooth-shaped extrusion portion; II-03: extrusion mechanism fixed tooth-shaped adjustment portion; II-0201: extrusion cam; II-0202: falling guide plate positioning shaft; II-0203: falling guide plate; II-0204: movable tooth-shaped extrusion plate positioning base plate; II-0205: extrusion rolling bearing bracket; II-0206: extrusion rolling bearing; II-0207: movable tooth-shaped extrusion plate; II-0301: fixed tooth-shaped extrusion plate; II-0302: fixed slot; II-0303: adjustable screw rod; II-0304: adjustment nut.

III-01: falling turning plate; III-02: falling guide plate; III-03: turning plate cam; IV-01: supporting framework; IV-02: motor; IV-03: motor bottom plate.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof;

For convenience of description, the words "above", and "below" appearing in this application only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on this application.

For the part of term explanation, terms in this application such as "mount", "connect", "connection", and "fix" should be understood in a broad sense. For example, the connection may be a fixed connection, a detachable connection, or an integral connection, a direct connection, an indirect connection by using an intermediate medium, an interior connection between two components, or interaction between two components. A person of ordinary skill in the art may understand specific meanings of the foregoing terms in the present invention according to a specific situation.

As introduced in the related art, the inventor finds that the existing cracking device has a non-ideal cracking effect, and generally has shortcomings of high unit energy consumption and low economy. In order to solve the above technical problems, the present application provides a cam roller type horizontal extrusion cracking system for walnuts.

Embodiment 1

A walnut pre-cracking system disclosed by the present embodiment is further described below in combination with FIG. 1 to FIG. 15.

Referring to FIG. 1, the cam roller type horizontal extrusion system for walnuts consists of a feeding device I, a cracking device II, a falling device III and a stand IV. The feeding device I is arranged above the cracking device II; and the falling device III is arranged below the cracking device II. The feeding device I includes a feeding box; the feeding box includes a case left side plate I-02 and a case right side plate I-05; an adjustable feeding scraper blade mechanism I-01 and a feeding baffle plate I-03 in the feeding device I are connected together with the case left side plate I-02 and the case right side plate I-05 by means of welding; and the feeding baffle plate I-03 and the adjustable feeding scraper blade mechanism I-01 are distributed in a set angle.

An intermittent feeding roller I-04 passes through the case left side plate I-02 and the case right side plate I-05 by means of a feeding roller shaft I-0403, and is then fixed on the plates through bearing pedestals. The left end of the feeding roller shaft I-0403 is connected with a threaded region thereof through a nut I-0404 to restrict the position of the intermittent feeding roller I-04; and the right end of the feeding roller shaft I-0403 restricts the position of the intermittent feeding roller I-04 by a feeding roller shaft fastening ring I-0408 via a feeding roller shaft fastening ring positioning pin I-0407. Feeding roller positioning screw rods I-0405 pass through the intermittent feeding roller I-04, and are connected with feeding roller positioning screw rod nuts I-0406 to restrict the intermittent feeding roller I-04 from unstably turning.

Figure 2:
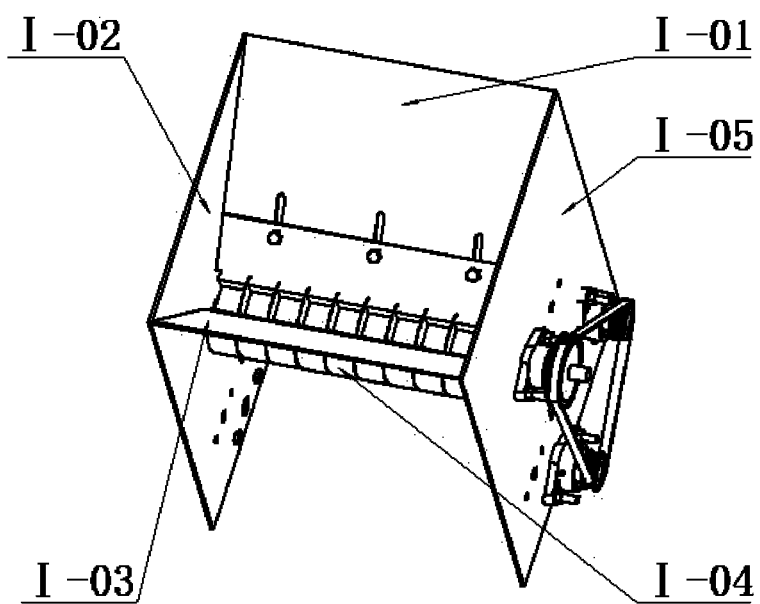
FIG. 2 is an axis side diagram of a feeding device.

As shown in FIG. 2, a feeding roller shaft bearing hole I-0201, a falling guide plate positioning shaft bearing hole I-0202, an extrusion cam shaft bearing hole I-0203, a fixed tooth-shaped extrusion plate limit hole I-0204, a falling turning plate shaft bearing hole I-0205 and a turning plate cam bearing hole I-0206 are formed in the case left side plate I-02.

Figure 3A:
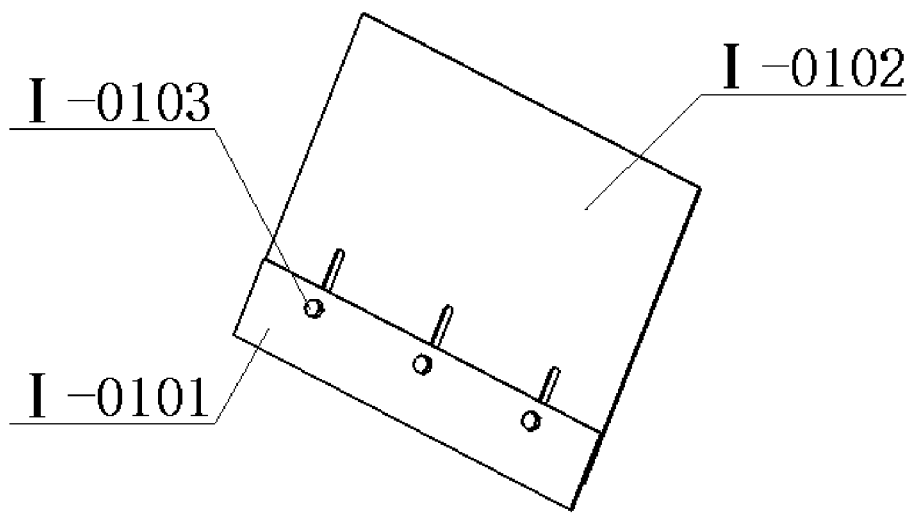
FIG. 3(a) is a diagram of an adjustable feeding scraper blade mechanism.
Figure 3B:
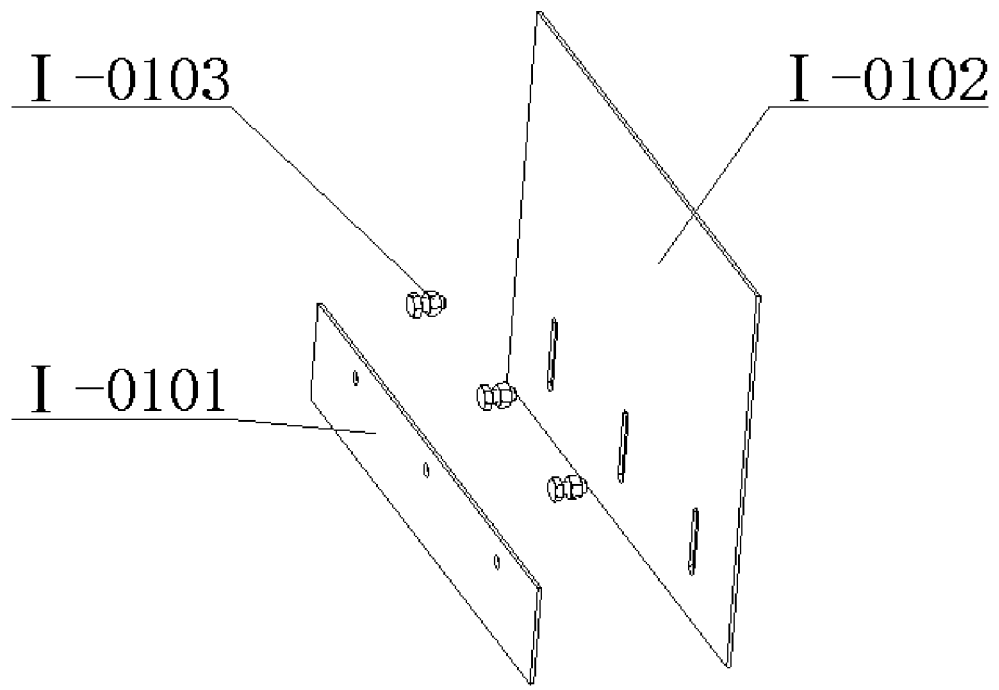
FIG. 3(b) is an exploded diagram of an adjustable feeding scraper blade mechanism.
Figure 4:
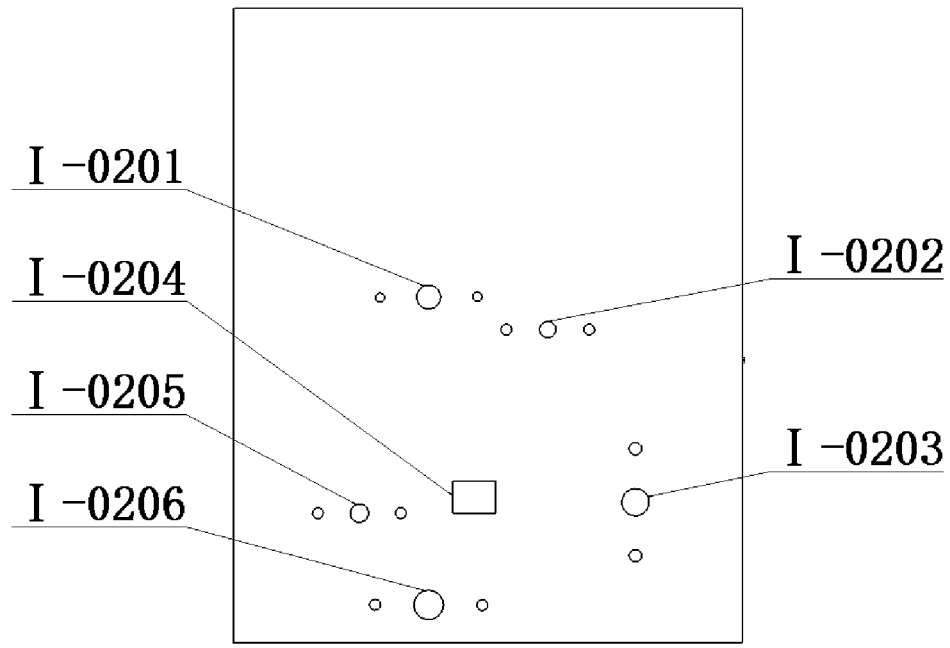
FIG. 4 is a front view of a case left side plate.

As shown in FIG. 3(*a*) and FIG. 3(*b*), the adjustable feeding scraper blade mechanism I-01 includes an upper feeding scraper blade I-0102 and a lower feeding scraper blade I-0101; a strip-shaped hole is formed in the upper feeding scraper blade I-0102; the upper feeding scraper blade I-0102 is connected together with the lower feeding scraper blade I-0101 by means of a hexagon flange nut I-0103; a position of connection between the upper feeding scraper blade I-0102 and the lower feeding scraper blade I-0101 may be changed by means of adjusting the position of the hexagon flange nut I-0103, so as to realize adjustment for walnuts in different sizes.

Figure 5:
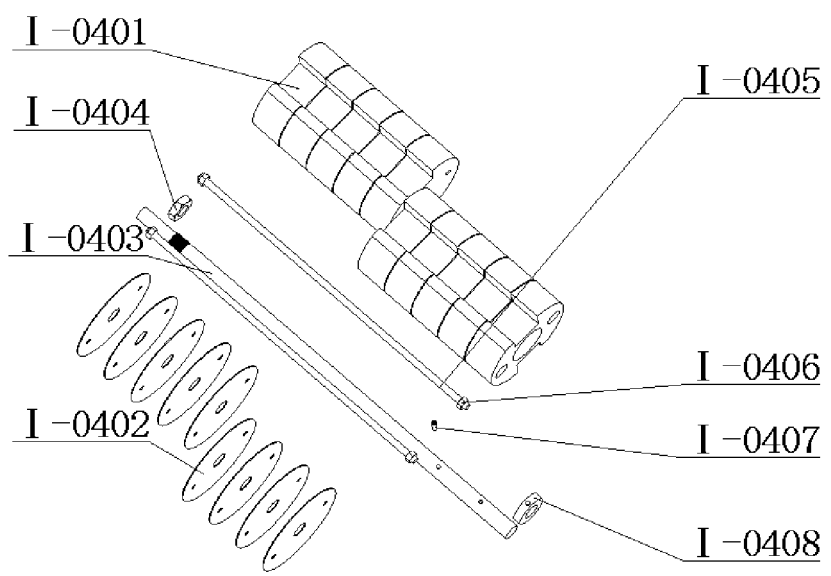
FIG. 5 is an exploded diagram of an intermittent feeding roller.

As shown in FIG. 5, the intermittent feeding roller I-04 includes a plurality of feeding roller constitution units I-0401, and a spacer I-0402 is arranged between adjacent feeding roller constitution units I-0401; a feeding roller shaft I-0403 passes through centers of the feeding roller constitution units I-0401; one feeding roller positioning screw rod I-0405 passing through the feeding roller constitution units I-0401 is arranged on each of two sides of the feeding roller shaft I-0403; and two ends of the feeding roller positioning screw rods I-0405 are connected with feeding roller positioning screw rod nuts I-0406. In the present embodiment, 10 feeding roller constitution units I-0401 and 9 spacers I-0402 are provided. The spacers I-0402 are located among the feeding roller constitution units I-0401 to play a role of restricting axial movement of the walnut.

Figure 6:
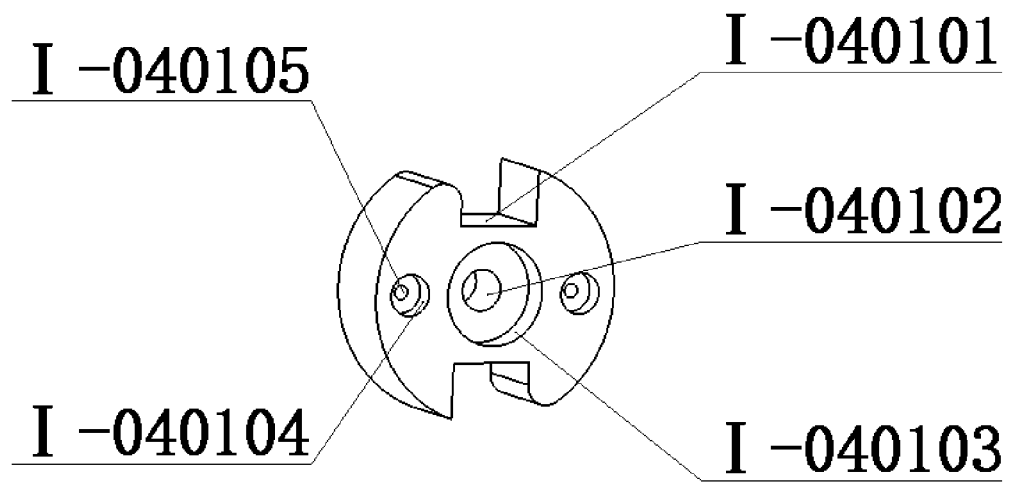
FIG. 6 is an axis side diagram of an intermittent feeding roller constitution unit.

As shown in FIG. 6, feeding slots I-040101 are formed in each feeding roller constitution unit I-0401 at an interval of 180°, and the feeding slots I-040101 are U-shaped. The depth of each feeding slot I-040101 matches the large diameter of the walnut, and the intermittent feeding roller I-04 cooperates with the adjustable feeding scraper blade mechanism I-01, so that only one walnut passes through each feeding slot I-040101 during each feeding, and quantitative and accurate feeding is realized.

Figure 7:
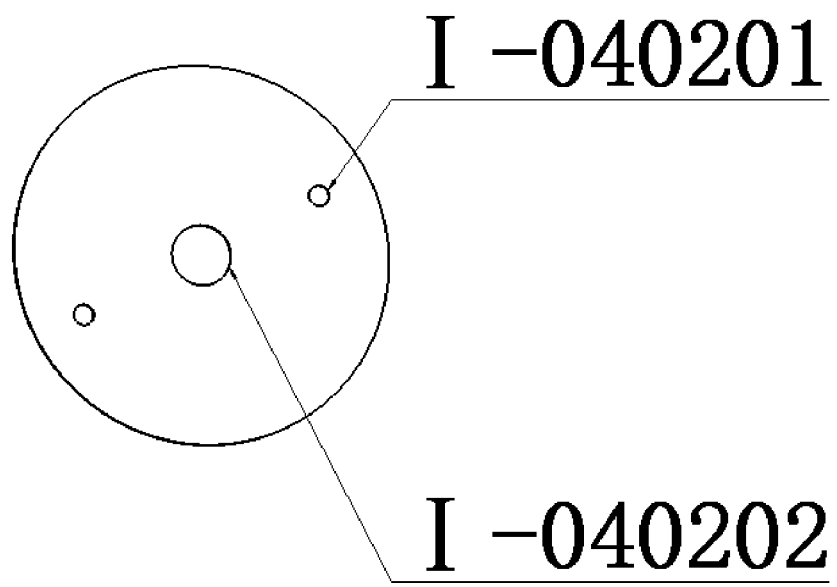
FIG. 7 is a front view of an intermittent spacer.
Figure 8:
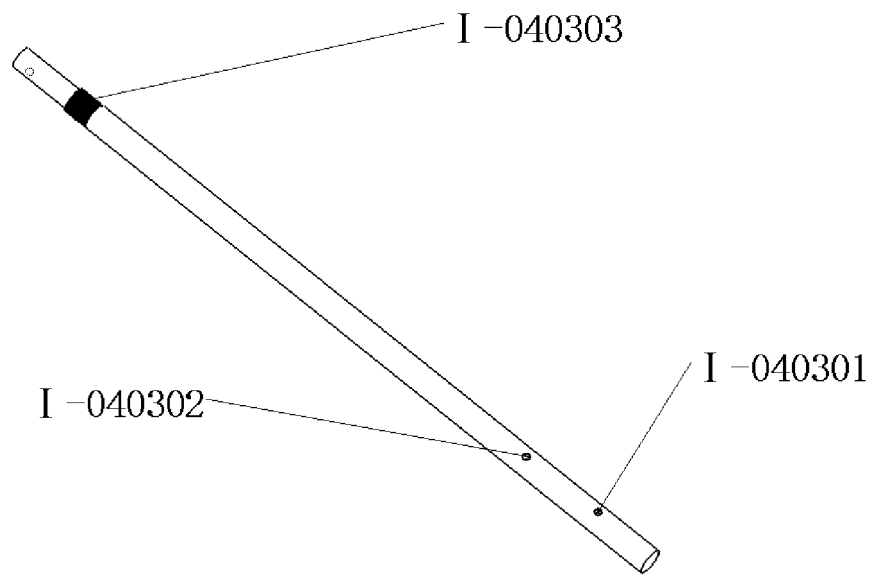
FIG. 8 is an axis side diagram of an intermittent feeding roller shaft.

A feeding roller shaft fastening nut counterbore I-040103 and a feeding roller constitution unit shaft hole I-040102 are formed in the center of the feeding roller constitution unit I-0401; two sides of the feeding roller constitution unit shaft hole I-040102 are symmetrically provided with a feeding roller positioning screw rod nut counterbore I-040104 and a feeding roller positioning screw rod hole I-040105; and the feeding roller shaft fastening nut counterbore I-040103 and the feeding roller positioning screw rod nut counterbore I-040104 are used for flush mounting of a fastening ring and a nut. As shown in FIG. 7, a spacer shaft hole I-040202 is formed in the center of the spacer I-0402, and two sides of the spacer shaft hole I-040202 are provided with spacer positioning screw rod holes I-040201. As shown in FIG. 8, a left end of the feeding roller shaft I-0403 is provided with a threaded region I-040303 for being connected with the feeding roller shaft fastening nut I-0404, and a right end of the feeding roller shaft is provided with a feeding roller shaft fastening hole I-040302 and a feeding roller shaft bearing fastening hole I-040301, and is connected with a feeding roller shaft fastening ring I-0408 by means of a fastening screw to achieve an objective of fastening the position.

Figure 9A:
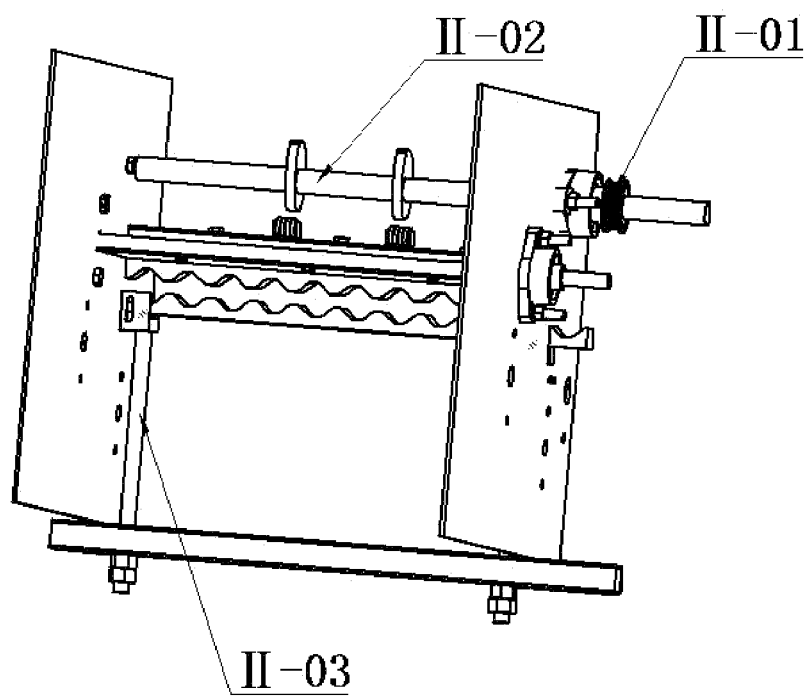
FIG. 9(a) is an axis side diagram 1 of a cracking device.
Figure 9B:
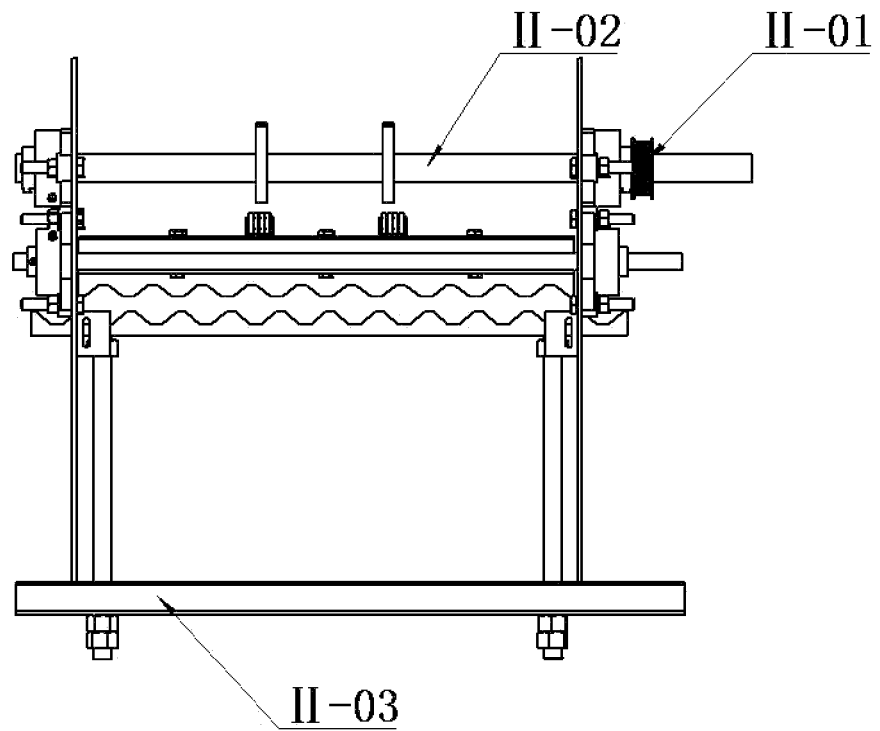
FIG. 9(b) is an axis side diagram 2 of a cracking device.

As shown in FIG. 9(*a*) and FIG. 9(*b*), the cracking device II mainly consists of an extrusion box body internal belt wheel II-01, an extrusion mechanism movable tooth-shaped extrusion portion II-02 and an extrusion mechanism fixed tooth-shaped adjustment portion II-03. The extrusion mechanism movable tooth-shaped extrusion portion II-02 includes an extrusion cam II-0201, a movable tooth-shaped extrusion plate II-0207 and other components; the extrusion cam II-0201 is mounted on an extrusion cam shaft; one end of the extrusion cam shaft is provided with a belt wheel II-01; and the belt wheel II-01 is connected with a power device by means of a transmission mechanism. The extrusion mechanism fixed tooth-shaped adjustment portion II-03 includes a fixed tooth-shaped extrusion plate II-0301 and a gap adjustment mechanism. The movable tooth-shaped extrusion plate II-0207 and the fixed tooth-shaped extrusion plate II-0301 which are parallel to each other are used as force application devices, and each of the movable tooth-shaped extrusion plate II-0207 and the fixed tooth-shaped extrusion plate II-0301 has 10 tooth gaps. The tooth gaps of the movable tooth-shaped extrusion plate II-0207 and the fixed tooth-shaped extrusion plate II-0301 are in one-to-one correspondence to the feeding slots I-040101 of the intermittent feeding roller I-04, and distances between the tooth gaps during feeding are equal to slot widths of the feeding slots I-040101.

Figure 10A:
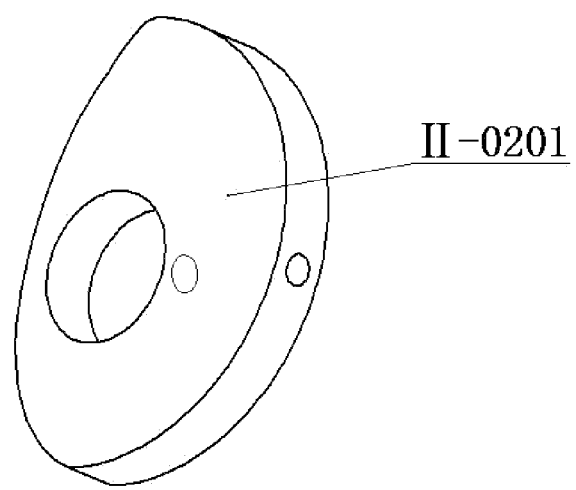
FIG. 10(a) is an axis side diagram of an extrusion cam.
Figure 10B:
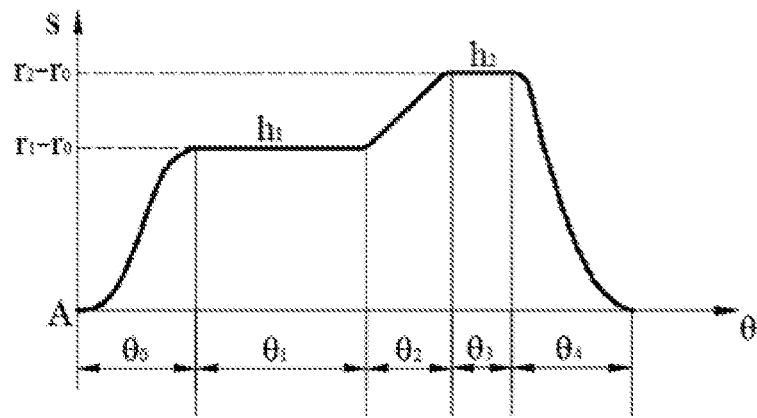
FIG. 10(b) is a schematic curve diagram of two extending strokes of an extrusion cam.
Figure 10C:
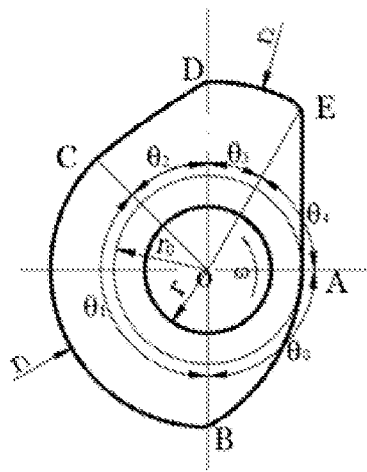
FIG. 10(c) is a schematic diagram of a size design of an extrusion cam.

As shown in FIG. 10(*a*), FIG. 10(*b*) and FIG. 10(*c*), the design of the extrusion cam II-0201 is introduced in detail below. According to the requirements and the manufacturing cost of the cracking device II, in order to reduce noise and dramatic vibration generated by operation of a mechanism, a cam with a combination of various motion laws is used to meet working requirements. That is, the extrusion cam II-0201 is set to have two extending strokes. Since a first extending stroke and a return stroke have large displacements, and corresponding rotating angles are also large, a quadratic polynomial motion law curve showing a gentle motion is used; and since the second extending stroke has a small displacement, and an extremely complicated curve brings high processing difficulty, a linear polynomial curve is used.

A quadratic polynomial motion law equation is:

$$S = C_0 + C_1\theta + C_2\theta^2 \quad (1)$$

$$V = \frac{dz}{dt} = C_1\omega + 2C_2\omega\theta V = \frac{ds}{dt} = C_1\omega + C_2\omega\theta$$

$$a = \frac{dv}{dt} = 2c_2\omega^2$$

in the equation, S is a displacement; $\theta$ is a rotating angle of the cam; $\omega$ is an angular speed of the cam; a is an acceleration; and $C_0$, $C_1$, and $C_2$ are set constants.

A linear polynomial motion law equation is:

$$S = C_0 + C_1\theta \quad (2)$$

$$V = \frac{ds}{dt} = C_1\omega$$

$$a = \frac{dv}{dt} = 0$$

in the equation, S is a displacement; $\theta$ is a rotating angle of the cam; $\omega$ is an angular speed of the cam; a is an acceleration; and $C_0$ and $C_1$ are set constants.

In view of requirements of structures of the machine body, the rotating speed of the extrusion cam is $n_0$ r/min, and a base circle diameter is $d_0$. In view of a gap between a walnut shell and a walnut kernel, the gap in a range of $m_{min}$ to $m_{max}$ is obtained by information query and own statistics. In view of a walnut peel having certain elasticity, cracks may not necessarily be produced under small deformation, and therefore, the maximum value $m_{max}$ is selected. Due to the symmetry of two sides, a total gap value is 2 $m_{max}$. Moreover, due to the action of the cam, a far end of a clamping device has gained the maximum force arm. It is assumed that the diameter of a walnut is $d_{min}$ to $d_{max}$, that is, a horizontal displacement $a_i$ between the extrusion plates at different lengths is $d_{min}$ to $d_{max}$; a displacement difference between two ends is calculated to be about equal to $\Delta d$, that is, $\Delta a_i$ is $\Delta d$, so that the extending stroke h of the extrusion cam II-0201 is determined to be $2^{m_{max}} + \Delta d = h$ in order to ensure that all walnuts falling to the middle and the bottom can be fully extruded to generate cracks.

Figure 11A:
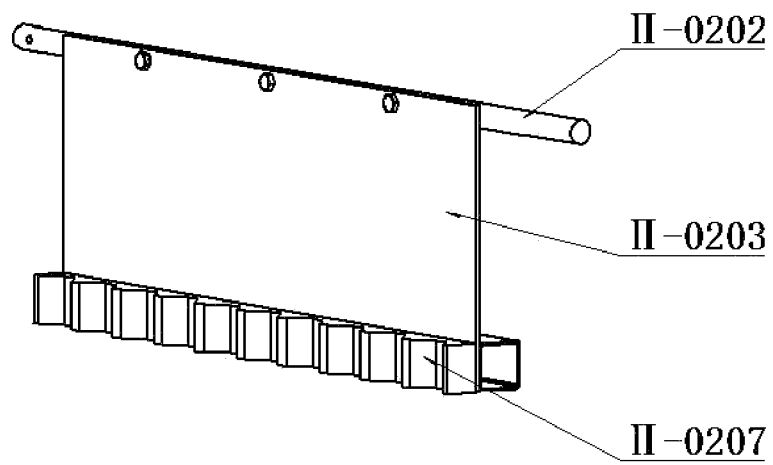
FIG. 11(a) is an axis side diagram 1 of a movable tooth-shaped extrusion plate fixing mechanism.
Figure 11B:
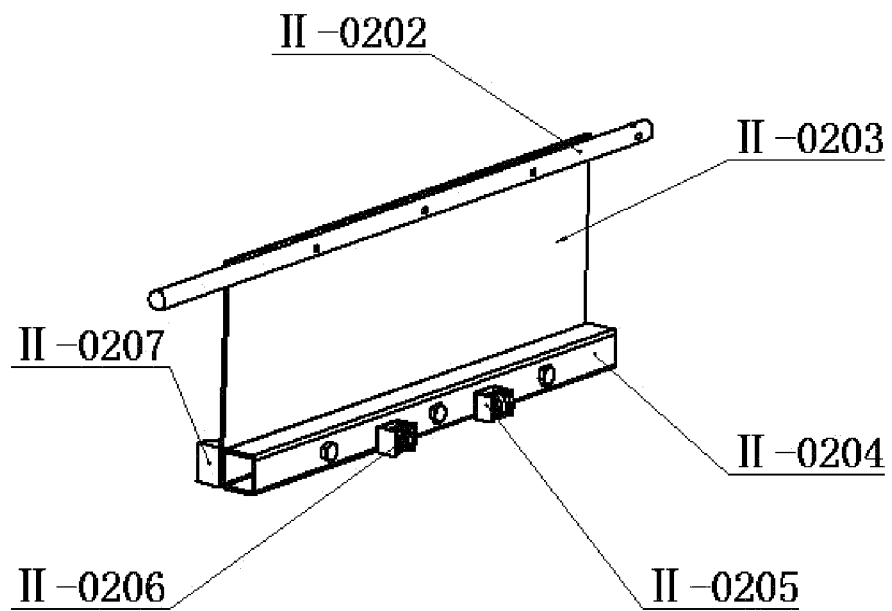
FIG. 11(b) is an axis side diagram 2 of a movable tooth-shaped extrusion plate fixing mechanism.

As shown in FIG. 11(*a*) and FIG. 11(*b*), one falling guide plate II-0203 is in threaded connection between the movable tooth-shaped extrusion plate II-0207 and the falling guide plate positioning shaft II-0202 to prevent the walnut from running out. The movable tooth-shaped extrusion plate II-0207 is located on one side of the falling guide plate II-0203, and the other side (the side compared to the movable tooth-shaped extrusion plate II-0207) of the falling guide plate II-0203 is welded with a transmission rod. A side surface of the transmission rod is provided with a movable tooth-shaped extrusion plate positioning base plate II-0204; an extrusion rolling bearing bracket II-0205 is fixed on a side surface of the movable tooth-shaped extrusion plate positioning base plate II-0204, and then an extrusion rolling bearing II-0206 is mounted; the number of the extrusion rolling bearing II-0206 is the same as the number of the extrusion cam II-0201; the extrusion rolling bearing II-0206 cooperates with the extrusion of the extrusion cam II-0201 to push or restore the movable tooth-shaped extrusion plate II-0207. The falling guide plate positioning shaft II-0202 is connected with an extrusion box body to fasten the falling guide plate II-0203.

Figure 12:
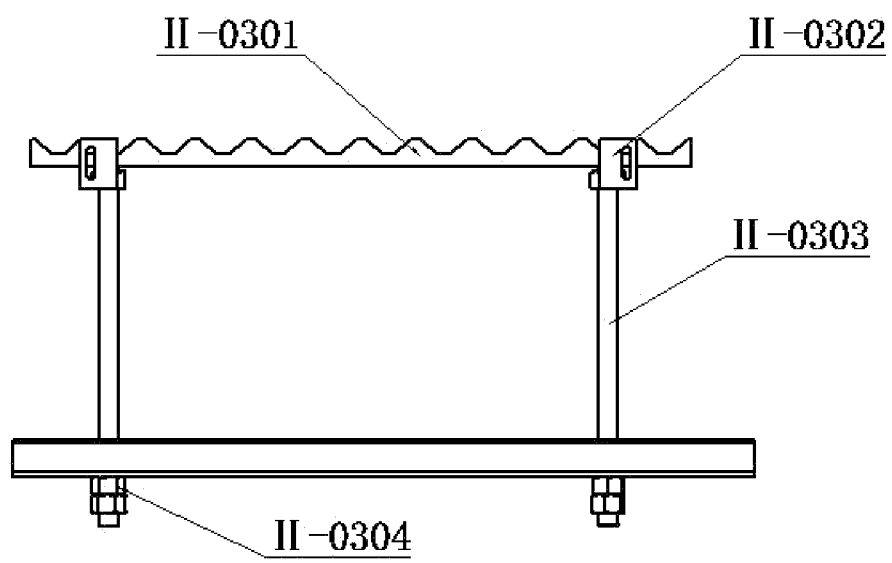
FIG. 12 is an axis side diagram of an extrusion mechanism fixed tooth-shaped adjustment portion.

As shown in FIG. 12, the gap adjustment mechanism includes two parallel adjustable screw rods II-0303; an adjustment nut II-0304 is mounted at one end of each adjustable screw rod II-0303; and the adjustable screw rods II-0303 are fixedly connected with a horizontal plate through nuts. In order to adapt to the problem of large walnut size differences caused by different varieties, fixed slots II-0302 are formed in the horizontal plate; and vertical columns pass through the fixed slots. An objective of pushing or pulling back the movable tooth-shaped extrusion plate II-0207 is achieved by screwing the adjustment nuts II-0304 and the adjustable screw rods II-0303, so as to realize gap adjustment and control between the tooth-shaped extrusion plate II-0207 and the fixed tooth-shaped extrusion plate II-0301 to adapt to a requirement of walnut crushing. A sum of the gap position between the two tooth-shaped extrusion plates and the large diameter of the walnut is a radius of the intermittent feeding roller I-04. During feeding of the feeding slots I-040101, walnuts can accurately fall into the gap between the two tooth-shaped extrusion plates.

Figure 13:
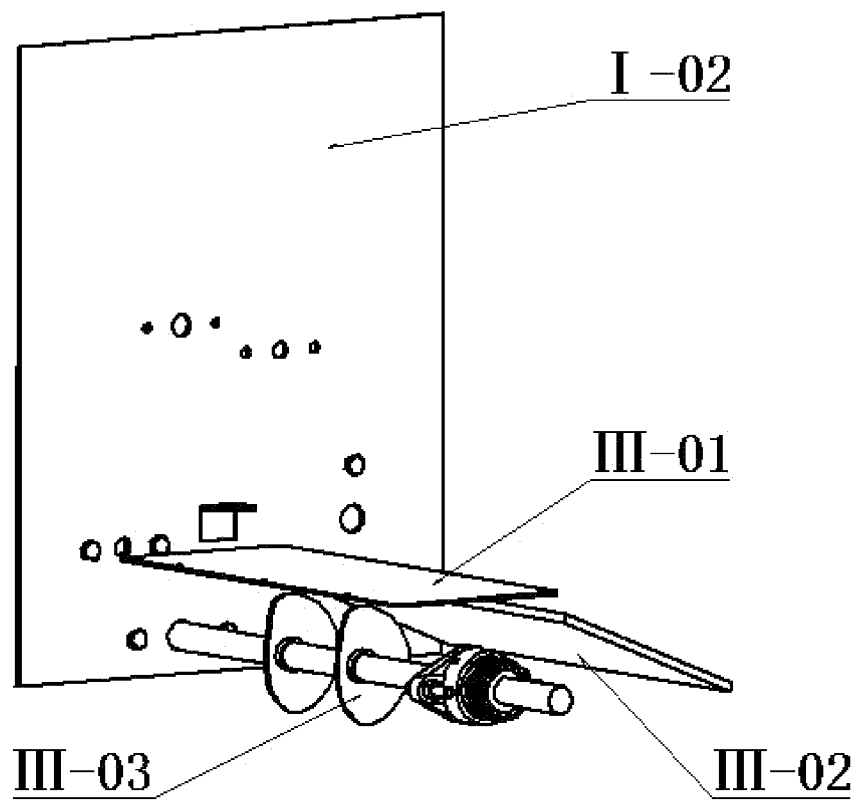
FIG. 13 is an axis side diagram of a falling device.
Figure 14:
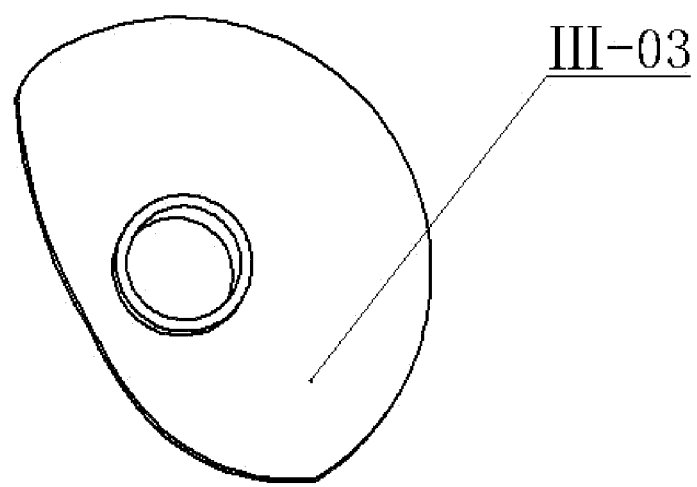
FIG. 14 is a front view of a turning plate cam.

As shown in FIG. 13 and FIG. 14, the falling device III includes a falling turning plate III-01, a turning plate cam III-03 and a falling guide plate III-02; the turning plate cam III-03 is fixed on a turning plate cam shaft through a positioning screw. The turning plate cam shaft is positioned and clamped between the case right side plate I-05 and the case left side plate I-02 through four groups of identical hexagon flange bolts and hexagon flange nuts, and cooperates with two groups of transmission wheels on the back side of the falling turning plate III-01 for motion. After one extrusion cycle, the falling turning plate III-01 turns over once to realize falling; materials fall onto the falling guide plate III-02 to realize gentle falling and avoid damage to the walnuts. The falling turning plate III-01 and the falling guide plate III-02 are in contact during falling; at this time, the turning plate cam III-03 is in a near resting state; at the end of falling, the turning plate cam III-03 rotates towards a maximum stroke direction; and at this time, the cracking device II would perform extrusion, and the extrusion cam II-0201 would enter a far resting state.

Figure 15:
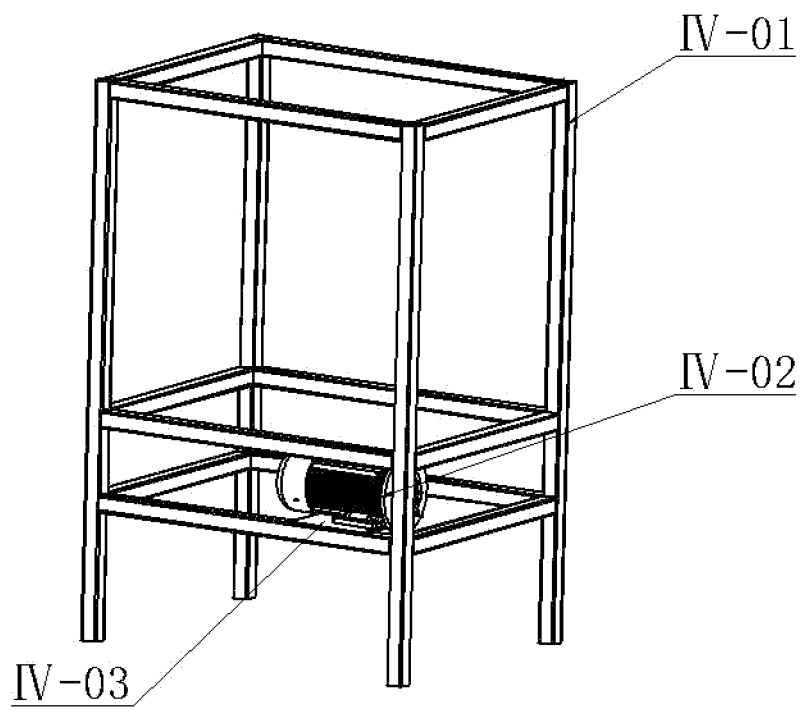
FIG. 15 is an axis side diagram of a stand.

As shown in FIG. 15, the stand IV includes a supporting framework IV-01 and a motor bottom plate IV-03 mounted at the bottom of the supporting framework IV-01. The power device of the present embodiment includes a motor IV-02 and a chain wheel transmission mechanism connected with the motor IV-02; and the motor IV-02 is fixed at the upper part of the motor bottom plate IV-03.

During work of the cracking system of the present embodiment, intermittent walnut feeding is realized by means of the intermittent feeding roller I-04 of the feeding device I, and the 10 feeding slots I-040101 in the intermittent feeding roller I-04 are used as cavities for feeding, so that the walnut is accurately aligned with a gap station of the two tooth-shaped extrusion plates in the cracking device II below. The walnut falls into the tooth gaps of the movable tooth-shaped extrusion plate II-0207 and the fixed tooth-shaped extrusion plate II-0301 after passing through the feeding device I; and at this time, the falling turning plate III-01 is in tight fit with the two tooth-shaped extrusion plates. The extrusion cam II-0201 drives the movable tooth-shaped extrusion plate II-0207 to do a periodic reciprocating motion, so as to cooperate with the fixed tooth-shaped extrusion plate II-0301 to perform extrusion cracking on the walnut. After the walnut passes through the cracking device II, the turning plate cam III-03 is used to cause the falling turning plate III-01 to do a periodic opening and closing motion and synchronously cooperate with the cracking device II, so that the cracked walnut falls to the falling guide plate III-02 and slides down along the direction to complete the whole cracking work. Each station repeats the above working flow immediately.

The above descriptions are merely preferred embodiments of this application and are not intended to limit this application. For those skilled in the art, this application may have various modifications and changes. Any modification, equivalent replacement, or improvement made without departing from the spirit and principle of this application shall fall within the protection scope of this application.

What is claimed is:

1. A cam roller type horizontal extrusion cracking system for walnuts, comprising a feeding device, a cracking device and a falling device which are fixed on a stand, wherein the feeding device is arranged above the cracking device; the falling device is arranged below the cracking device;

the feeding device comprises a feeding box; an intermittent feeding roller is arranged in the feeding box; a first side of the intermittent feeding roller is provided with a feeding baffle plate, and a second side of the intermittent feeding roller is provided with an adjustable feeding scraper blade mechanism; two rows of feeding slots separated by 180° are formed in the intermittent feeding roller; the feeding baffle plate and the adjustable feeding scraper blade mechanism are arranged at an angle to each other; the adjustable feeding scraper blade mechanism comprises an upper feeding scraper blade and a lower feeding scraper blade; a mounting position of the lower feeding scraper blade on the upper feeding scraper blade is adjustable;

the cracking device comprises an extrusion box body; a movable tooth-shaped extrusion plate and a fixed tooth-shaped extrusion plate are oppositely mounted in the extrusion box body; a first side of the movable tooth-shaped extrusion plate away from the fixed tooth-shaped extrusion plate is provided with an extrusion cam; the movable tooth-shaped extrusion plate and the fixed tooth-shaped extrusion plate respectively have a plurality of tooth gaps; the cracking device is configured such that walnuts that have passed through the feeding device fall into a gap between the movable tooth-shaped extrusion plate and the fixed tooth-shaped extrusion plate; the extrusion cam drives the movable tooth-shaped extrusion plate to do a periodic reciprocating motion, so as to synchronously cooperate with the fixed tooth-shaped extrusion plate to perform extrusion cracking on the walnuts; and the falling device comprises a falling turning plate, a turning plate cam and a falling guide plate; the turning plate cam is located below the falling turning plate; and the falling turning plate and the falling guide plate are in contact with each other during falling of the walnuts.

2. The cam roller type horizontal extrusion cracking system for walnuts according to claim 1, wherein the intermittent feeding roller is horizontally mounted in the feeding box; the intermittent feeding roller comprises a plurality of feeding roller constitution units; and a spacer is arranged between adjacent feeding roller constitution units.

3. The cam roller type horizontal extrusion cracking system for walnuts according to claim 1, wherein the tooth gaps of the movable tooth-shaped extrusion plate and the fixed tooth-shaped extrusion plate are in one-to-one correspondence to the feeding slots of the intermittent feeding roller, and distances between the tooth gaps during feeding are equal to slot widths of the feeding slots.

4. The cam roller type horizontal extrusion cracking system for walnuts according to claim 3, wherein the movable tooth-shaped extrusion plate is connected with the falling guide plate by a falling guide plate positioning shaft; the falling guide plate positioning shaft is connected with the extrusion box body; one side of the falling guide plate facing away from the movable tooth-shaped extrusion plate is provided with an extrusion rolling bearing; and the extrusion rolling bearing cooperates with extrusion of the extrusion cam.

5. The cam roller type horizontal extrusion cracking system for walnuts according to claim 3, wherein the fixed tooth-shaped extrusion plate is connected with a gap adjustment mechanism comprising an adjustable screw rod;
gap adjustment between the fixed tooth-shaped extrusion plate and the movable tooth-shaped extrusion plate is realized by the adjustable screw rod;
one end of the adjustable screw rod is fixedly connected with a horizontal plate through a nut;
a fixed slot cooperating with a vertical column of the fixed tooth-shaped extrusion plate is formed in the horizontal plate; and
the other end of the adjustable screw rod is provided with an adjustment nut.

6. The cam roller type horizontal extrusion cracking system for walnuts according to claim 1, configured such that when the intermittent feeding roller rotates to drive the feeding slots for feeding the walnuts, each walnut is guided by the falling guide plate to fall into a respective one of the tooth gaps; and
a depth of each feeding slot is such that only one walnut passes through a respective one of the feeding slots during each rotation of the intermittent feeding roller.

7. The cam roller type horizontal extrusion cracking system for walnuts according to claim 1, wherein the movable tooth-shaped extrusion plate is connected with the falling guide plate by a falling guide plate positioning shaft; the falling guide plate positioning shaft is connected with the extrusion box body; one side of the falling guide plate facing away from the movable tooth-shaped extrusion plate is provided with an extrusion rolling bearing; and the extrusion rolling bearing cooperates with extrusion of the extrusion cam.

8. The cam roller type horizontal extrusion cracking system for walnuts according to claim 1, wherein:
the fixed tooth-shaped extrusion plate is connected with a gap adjustment mechanism comprising an adjustable screw rod;
gap adjustment between the fixed tooth-shaped extrusion plate and the movable tooth-shaped extrusion plate is realized by the adjustable screw rod;
one end of the adjustable screw rod is fixedly connected with a horizontal plate through a nut;
a fixed slot cooperating with a vertical column of the fixed tooth-shaped extrusion plate is formed in the horizontal plate; and
the other end of the adjustable screw rod is provided with an adjustment nut.

9. The cam roller type horizontal extrusion cracking system for walnuts according to claim 1, wherein the turning plate cam is connected with a power device through a transmission mechanism; the turning plate cam is in linear contact with the falling turning plate through a rolling bearing to realize periodic intermittent swinging of the falling turning plate; and when the walnuts pass through the feeding device and enter the cracking device, the turning plate cam is in a process of moving from a minimum stroke to a maximum stroke.

10. The cam roller type horizontal extrusion cracking system for walnuts according to claim 1, wherein a feeding roller shaft is mounted in a center of the intermittent feeding roller; one end of the feeding roller shaft is provided with a threaded region; and two sides of the feeding roller shaft are provided with feeding roller positioning screw rods that pass through the intermittent feeding roller.

* * * * *